INVENTORS
JOHN J. KANTZ, JR &
OSWALD J. LINDELL
BY
Oberlin + Limbach
ATTORNEYS

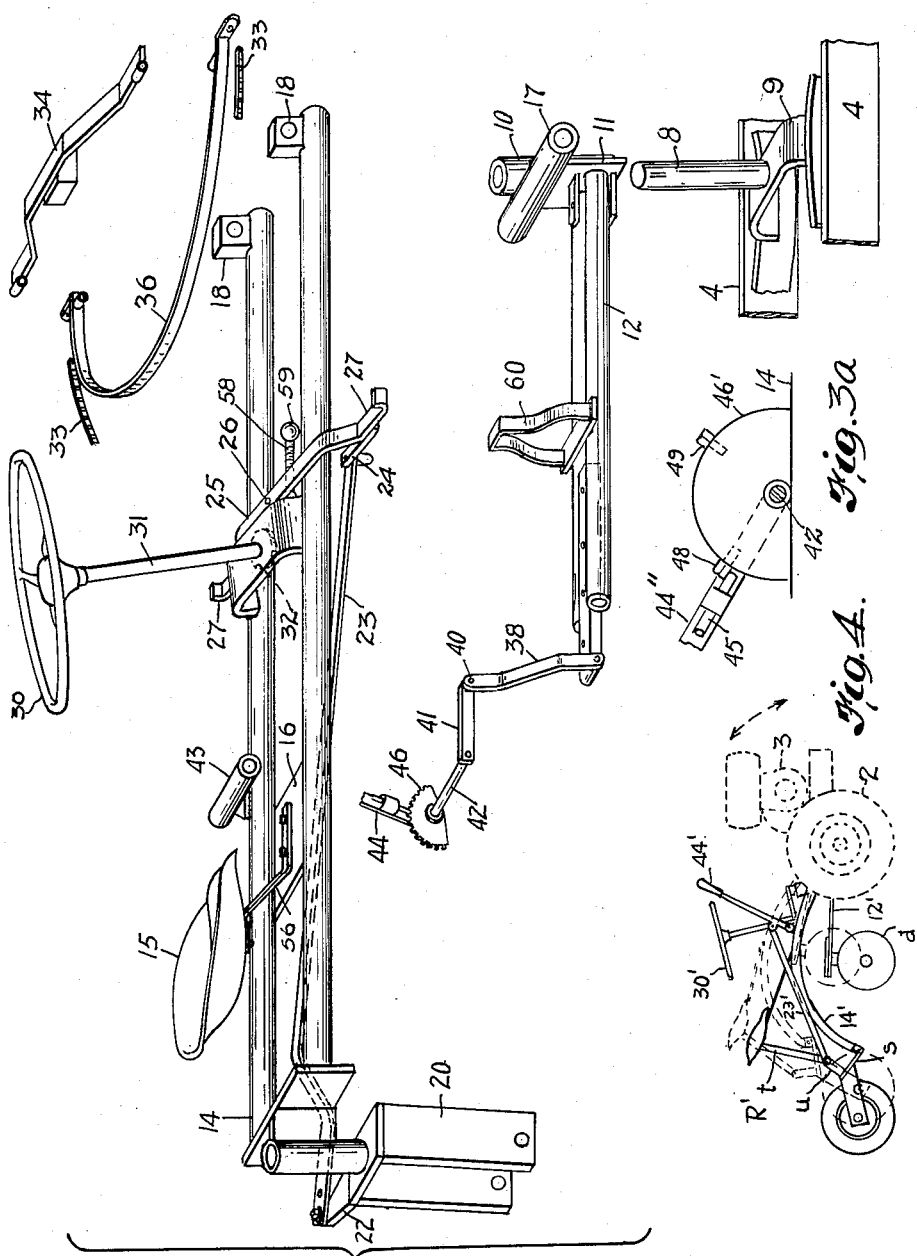

Patented Nov. 3, 1953

2,657,621

UNITED STATES PATENT OFFICE 2,657,621

GARDEN TRACTOR

John J. Kantz, Jr., and Oswald J. Lindell, Rock Creek, Ohio, assignors to The Great Lakes Tractor Company, Rock Creek, Ohio, a corporation of Ohio Application December 7, 1948, Serial No. 64,004

10 Claims. (Cl. 97—47.04)

Tractors of the form most commonly known are riding devices of considerable size and weight for large scale heavy-duty plowing and cultivating. To some extent small two-wheel tractors have come into use, in which the operator walks behind and guides the device by rearwardly extending handles rigid with the frame. In Patent No. 2,196,347, there is shown a version of the latter in which a riding seat may also be attached if desired, using the same guiding handle means. While the seat adds to the convenience, a drawback is introduced in the trailing support wheel under the seat which merely follows in a trailing line and cannot track right at all times for row cultivation, and for turns, etc. Furthermore, also, such attachment destroys the control otherwise had by the operator when walking, as to the tilt on the front axis. By the present invention a construction may now be had, however, available with wide versatility for various soil-working operations in gardens, truck farming, etc., and usable by the operator in walking or in riding positions, if desired, and being controllable with precision throughout. Other objects and advantages will appear from the following description.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 3 is an exploded view of the riding frame, on larger scale;

Fig. 3a is an enlarged modification detail;

Fig. 4 is a semi-schematic side elevational view of modified construction, on smaller scale.

Figure 1:
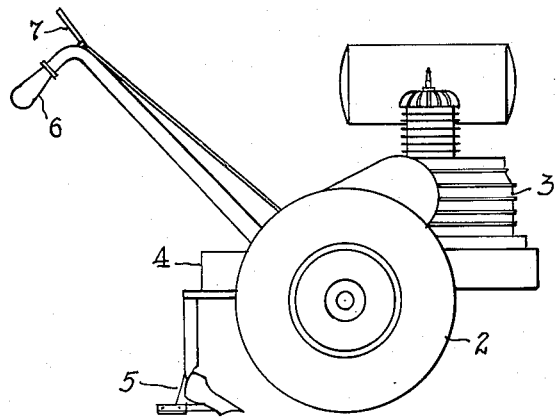
Fig. 1 is a side elevational view of the power garden tractor to which the riding frame of the present invention is attached.

As shown in Fig. 1, the power traction-wheel portion of the device embodies paired traction wheels 2, controllably driven by a power source 3, such as an internal combustion engine, mounted on the frame 4 supported between the wheels. A soil-working tool, illustrated by a plow 5, is detachably carried by the frame, and guide handles 6 bolted to the respective side portions of frame 4, and a throttle lever 7, serve as control means as adapted for walking use. By removing the handles 6 and attaching to the frame 4, the riding frame R, the tractor becomes a riding-type tractor, as in Fig. 2. For this (referring also to Fig. 3) the post 8 secured to the frame above the wheel-axis, as by a plate 9 bridging the frame, receives a sleeve 10, this seating over the post. Secured to the sleeve 10 with a plate 11 is a tool-carrying frame 12, to which is bolted the plow 5 or other tool, and it is noticed that the tool-carrying frame 12, with its sleeve 10, is pivoted to the post 8, whereby the tool and its frame and the wheel-frame 4 have relative movement to permit steering. Connected to the foregoing is the seat-carrying frame proper 14, the seat 15 being secured thereto in convenient manner, for instance a cross-plate 16, and the frame members 14 at their forward ends are pivotally connected to a transverse tubular member 17 of a tool carrying frame 12, as by a bolt extending through the lugs 18 of the frame members 14, and also through the tubular member 17. While the tool carrying frame 12 is pivoted to the post 8 of the tractor frame 4, and the seat-carrying frame 14 is rigid with frame 12 for simultaneous transverse movement, relative vertical movement as between frames 12 and 14 is permitted. In this relative movement between frames 12 and 14 it will be noticed that the seat frame 14 rides level, but the tool-carrying frame 12 can be moved up and down, the frame 4 which carries the engine joining in this movement with frame 12, about the axis of the wheels 2, the range of such movement up or down being like that indicated by the arrow at the right of Fig. 4. The seat-carrying frame 14 at its rear end has a stirrup 20 with a trailing wheel 21, the stirrup having an upstanding stem pivoted in and having a retaining head on top of a bearing sleeve projecting at the rear end of the seat frame 14. And projecting from the end of the stirrup is a lateral lever 22 to which is pivoted an adjustable link 23 whose front end is pivoted at 24 to a transverse foot-lever 25 centrally pivoted at 26 to a projection on the framing 14. This lever 25 provides two foot-pedals 27 for the operator's feet, and it is seen that with this the trail wheel 21 can be held easily and steadily in a straight line or may be guided or turned ad libitum. This, it is noticed, makes possible extremely short turns, and greatly reduces over-travel at the ends of rows, for instance. In addition to the foot pedal control of the trail wheel, the front traction wheels are also steerable by the operator, through the medium of the steering wheel 30 on the column 31, to whose lower end there is fixed a sprocket wheel 32 about which is trained a sprocket chain 33, the ends thereof being secured to the respective ends of a cross-arm 34 which is fixed to the top end of the post assembly 8, 10. The sprocket chain 33, as thus manipulated through the medium of the steering wheel 30 and the sprocket 32, turns the cross-arm 34 right or left as desired, and with it also the entire traction wheel assembly under the front end of the seat-carrying frame. Thus, a dual steering control is provided, both front and rear end having control means usable together or independently, as circumstances make desirable. To guide and support the sprocket chain 33 on turning movement, a support arc 36 is also secured to the ends of the cross-arm 34, as clearly shown in Fig. 2.

With the tool-carrying frame 12 and the seat-carrying frame 14 thus in assembly, the tool-carrying frame 12 is adapted for relative movement up and down, to set the soil-working tool into the ground at depth as desired or to carry the tool clear of the ground. For this, a link 38 pivoted at 39 to one end of the tool-carrying frame 12 is pivoted at 40 in turn to a lever arm 41 fixed to the end of a shaft 42. The shaft 42 is carried in a bearing sleeve or tube 43 secured on the frame member 14, and at its outer end is a hand lever 44 which controls the tool-frame lifting system. This hand lever, as shown most clearly in Fig. 2, has a spring-returned detent 45 which may engage in recesses in the arc 46. By pressing upwardly on the detent 45, against the handle of the lever 44, the detent is raised free of the recesses of the arc 46 and the lever 44 may then be set at any point of the arc desired. A cutter disk 47 may generally be carried with the plow assembly on the tool-carrying frame. It is understood, of course, that, as usual in tractor application, various tools may be substituted, including shovel cultivators, weed cutters, etc.

In Fig. 4, again the paired wheels 2 and frame and power plant 3 have a seat-carrying frame R' attached. Here, again, the tool-carrying frame 12' is rigid with the power supporting frame. A disk cultivator d is here illustrated as the tool. The framing 14' is here also rigid with the front end connection of the tool-carrying frame 12', but the rear end of the framing 14' is hinged to a plate s secured to the top of the wheel-stirrup. An upstanding post u is also secured to the plate s, and on the top of this post is pivotally connected the seat stem t. A hand lever 44' connects by a link 23' to the same pivot point at the top of the post u to which the seat stem is pivoted. Thereby, on manipulation of the hand lever 44', the tool-carrying frame 12' and the framing 14' are both raised, thereby lifting the disk or other tool from the ground, this movement being possible by virtue of the hinged joint between the framing 14' and the plate s. The wheel frame is, of course, also tilted correspondingly at the same time.

Figure 2:
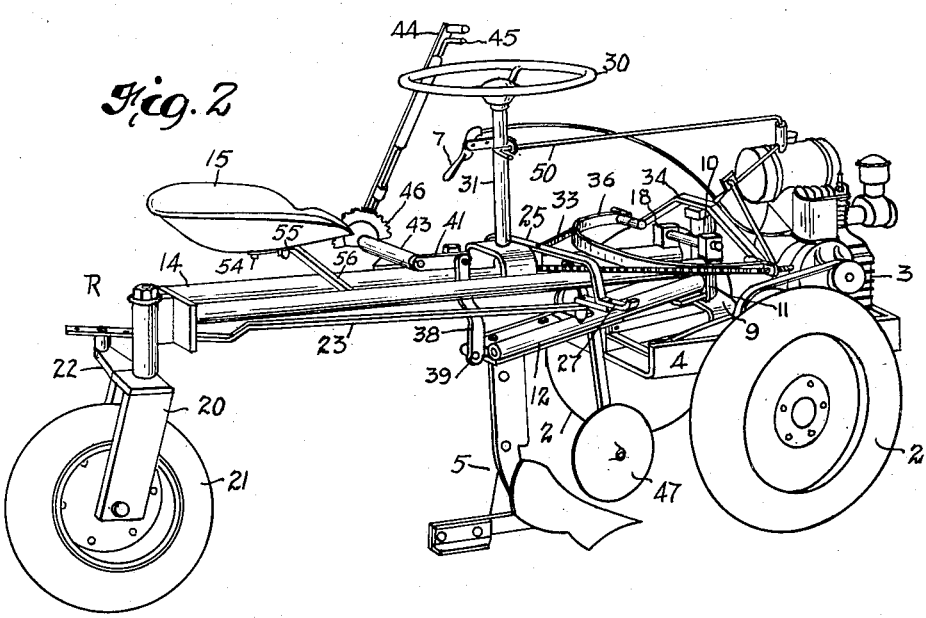
Fig. 2 is a perspective view of the same with the guide handles removed and a riding frame attached.

As seen, the two-wheeled traction unit 2, 3 is the power unit in Figs. 1, 2 and 4. This is characterized by an axis center, the wheel axis, about which some movement in arc of rotation up and down is permitted. In Fig. 1, with use of the tractor portion as a walking outfit, the operator by the handles 6 can swing the structure up and down about the wheel axis center and raise the soil-working tool or depress it. Fig. 4 shows graphically how, with a riding attachment the operator sitting in the seat or seat-port t can by the lever 44' swing the tractor portion up and down about the wheel axis center, and the tool-carrying arm 12' as a radius is correspondingly moved, and the tool carried thereby.

Figure 5:
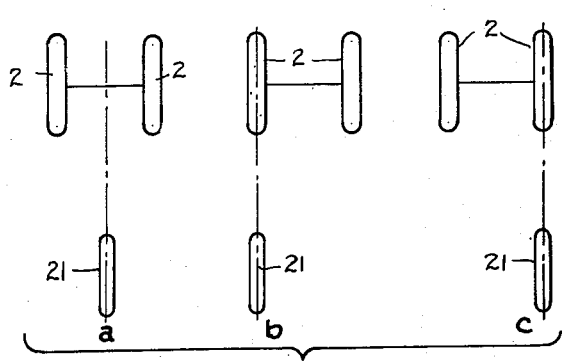
Fig. 5 is a diagrammatic plan view illustrating how the rear wheel can be controlled to travel in any precision alignment desired.

The manner of use of the device will be clear from the foregoing. With the equipment as a walking outfit as in Fig. 1, the operator walks behind the device as it is propelled along on its traction wheels 2, and the operator guides by the handles 6, and controls the engine by the throttle lever 7. On unbolting and taking off the handles and whatever earth-working tool is bolted on frame 4, and attaching the riding frame R by setting its forward sleeve 10 in place on the post 8, the operator sitting in the seat 15 controls the engine by the throttle lever 7 which is conveniently carried on the steering column, and the clutch lever 50 likewise is in convenient reach. By manipulation of the detent 45 and the tool-control lever 44, the plow or other tool can be set in the soil or be elevated thereabove, as desired. The front end steering is carried on by the steering wheel 30. Ordinarily, the operator, with his feet on the rests 27 of the lever 25, simply effortlessly holds the trail wheel 21 normally in alignment as it trails along. Thus, with a setting as in a, Fig. 5, the trail wheel 21 is centered between the front wheels 2. Where such positioning is not feasible on account of row crops, the operator may simply move the foot control lever to throw the trail wheel to the left-hand position b or to the right-hand position c, Fig. 5. In any position, because of the leverage, the maintaining of the desired alignment requires little effort on the part of the operator.

When it is desired to use the tractor as a walking outfit, the riding frame is disengaged by lifting its forward sleeve 10 off of the tractor frame post 8, and bolting the handles and whatever tool is desired onto the frame 4.

It is noticed that by reason of the peculiar mounting of the tool-carrying frame with respect to the wheel axis, i. e. both centered to a common axis, two moment levers in effect exert their action about the wheel axis, viz., the moment lever of the traction wheels thrusting its torque in one direction, and the moment lever of the tool-carrying frame thrusting its torque in the opposite direction. Thereby, because of this peculiar mount relation involving center axis between tool and power, when the tool control lever 44 is released to lower the plow or other tool to the ground, the torque effect draws the plow into the soil to equilibrium depth and saves the operator the necessity of using his muscle energy for forcing the plow to the requisite soil depth. Again, with the tractor in operation, the torque reaction holds the tool in the ground effectively and at the same time occasions a particularly firm grip on the ground by the traction wheels. It is thus found that a motor of smaller power than customarily rated necessary for a device of this size drives the tractor efficiently on various types of soil and contours.

Where a considerable amount of plowing or a considerable amount of cultivating is to be done at a time, it is advantageous to make the setting of the trail wheel automatic instead of requiring any attention by the driver. For this, when the driver lowers the plow or cultivator tool into the ground, the trail wheel is automatically steered into the proper track. Thus, referring to Fig. 3, projecting forwardly is an arm 58 integral with or secured to the foot-lever 25, and on its end is a freely rotatable roller or ball 59 which rides within the cam cage 60 secured to the tool-carrying frame 12. When the tool-carrying frame is raised by the hand lever 44 to hold the plow or other tool above the ground, the cam cage 60 is in its upper position and the arm 58 can move freely through a wide arc between the sides of the cage 60, and this allows full latitude of steering movement by the driver, using the foot lever 25 to maneuver the trail wheel in any kind of turning desired, as for instance at row ends. But when the driver sets the plow or other tool down into the ground by the hand lever 44, it is seen that the cage 60 carried down with the tool frame 12 has its converging upper end brought down about the roller end 59 of the arm 58, thereby camming the arm and the rearward link 23 to steer the trail wheel into its predetermined track without attention by the driver. With particular advantage, the arm 58 may be secured to the lever 25 by screw-thread connection. Thereby, the arm can be easily run back or shortened so that its end 59 is clear of the cam cage 60 and is not controlled by it. Complete hand control may thus be had when such is desired instead of automatic control for the trail wheel tracking. By providing the rear end of the link 23 with a series of holes, the bolt pivotally connecting it to the stirrup lever 22 can be set in the appropriate hole for the proper length for either center or lateral tracking of the trail wheel.

The tool-control lever 44 by its spring-returned detent 45 coacting with the recesses in the arc or quadrant 46 as shown in Fig. 2 permits the operator to set the plow or other tool at depth as desired by selection of the recess engaged. In some cases, it is preferred to further simplify the requirement on the operator, and as shown in the slightly modified detail construction in Fig. 3a, the arc 46', instead of having a series of recesses for the detent, for instance is tapped with a series of bolt holes to selectively receive squarehead set screws as 48 and 49, against which the detent 45 may engage. These are preset to meet the local conditions. Thus, with the detent back of the set-screw 48 as shown in Fig. 3a, the control holds the plow or other tool above the ground. But on releasing the detent and moving the lever 44 forward, the tool is lowered until the detent engages the stop set-screw 49. It can also be moved beyond that pre-set depth when desired, by simply holding out the detent to pass the stop 49. Where tools are secured to the frame 4 in front of the wheels 2 instead of behind, it is seen that likewise the lever 44 controls the raising and lowering of the tool relative to the ground, as again there is the tilting of the frame on the wheel axis as center.

Figure 2A:
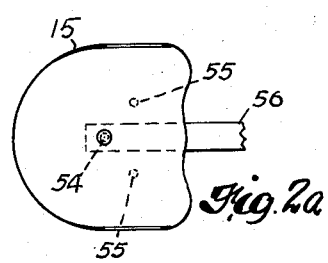
Fig. 2a is a plan view of seat-mounting detail.

In instances where desired, the driver's seat may be sufficiently loose or pivoted on its holding bolt 54 to allow moving through a small arc such that the driver may always automatically adjust himself to face straight ahead when the trail wheel is in any of its alignments; and turning of the seat beyond the necessary arc may be prevented by any suitable means, for example a simple stop 55 projecting from the seat below at each side spaced to be limited in movement-swing against the side of the horizontal portion of seat support bracket 56, Fig. 2 and Fig. 2a.

Other modes of applying the principle of the invention may be employed, change being made as regards the detail described, provided the features stated in any of the following claims, or the equivalent of such, be employed.

We therefore particularly point out and distinctly claim as our invention:

1. In agricultural machinery having a pair of traction wheels, framing supported therebetween, a power source on the framing controllably connectable to said traction wheels; and a post on said framing normal to the axis of the wheels; a separable riding trailer, including an auxiliary frame having a tubular collar to pivotally set on said post, longitudinal members rigid with said collar and extending rearwardly; an earth-working tool carried by said members, other longitudinal members pivoted to said collar for relative vertical movement but rigid against lateral movement relative to the first-named members, a hand lever on said other longitudinal members, and a link connected to said tool-carrying members, a seat on said other longitudinal members pivoted for limited turning movement, a steering wheel and column mounted on the same longitudinal members in front of said seat, a sprocket on the steering column, a chain engaging said sprocket, a cross arm fastened to the aforesaid post, said chain connecting at each end to the respective ends of said cross arm, an arcuate chain-rest bowed rearwardly between the ends of said cross arm, a foot steering lever pivotally carried by said other longitudinal members, a trailing wheel in a swivel stirrup under the rear end of said other longitudinal members, and a link connecting between said foot steering lever and said swivel stirrup for steering independently of the front wheel steering.

2. In agricultural machinery having a pair of traction wheels, framing supported therebetween, a power source on the framing controllably connectable to said traction wheels, and a post on said framing normal to the axis of the wheels, a separable riding trailer, including an auxiliary frame having a tubular collar to pivotally set on said post, longitudinal members rigid with said collar and extending rearwardly, an earth-working tool carried by said members, other longitudinal members pivoted to said collar for relative vertical movement but rigid against lateral movement relative to the first-named members, a hand lever on said other longitudinal members, and a link connected to said tool-carrying members, a seat on said longitudinal members, a steering wheel and column mounted on the same longitudinal members in front of said seat, a sprocket on the steering column, a chain engaging said sprocket, a cross arm fastened to the aforesaid post, said chain connecting at each end to the respective ends of said cross arm, an arcuate chain-rest bowed rearwardly between the ends of said cross arm, a foot steering lever pivotally carried by said other longitudinal members, a trailing wheel in a swivel stirrup under the rear end of said other longitudinal members, and a link connecting between said foot steering lever and said swivel stirrup for steering independently of the front wheel steering.

3. In agricultural machinery having a pair of traction wheels, framing supported therebetween, a power source on the framing connectable to said traction wheels; and a post on said framing normal to the axis of the wheels, a separable riding trailer, including an auxiliary frame having a tubular collar to pivotally connect to said post, longitudinal members rigid with said collar, and extending rearwardly, an earth-working tool carried by said members, other longitudinal members pivoted to said collar for relative vertical movement but rigid against lateral movement relative to the first-named members, a hand lever on said other longitudinal members and a link connected to said tool-carrying members, a seat on said other longitudinal members, a steering wheel and column mounted on the same longitudinal members in front of said seat, a sprocket on the steering column, a chain engaging said sprocket, a cross arm fastened to the aforesaid post, said chain connecting at each end to the respective ends of said cross arm, a foot steering lever pivotally carried by said other longitudinal members, a trailing wheel in a swivel stirrup under the rear end of said other longitudinal members, and a link connecting between said foot steering lever and said swivel stirrup for steering independently of the front wheel steering.

4. In agricultural machinery having a pair of traction wheels, framing supported therebetween, a power source on the framing connectable to said traction wheels, and a post on said framing normal to the axis of the wheels, a separable riding trailer, including an auxiliary frame having a tubular collar to pivotally set on said post, longitudinal members rigid with said collar and extending rearwardly, an earth-working tool carried by said members, other longitudinal members pivoted to said collar for relative vertical movement but rigid against lateral movement relative to the first-named members, a hand lever on said other longitudinal members and a link connected to said tool-carrying members, a seat on said other longitudinal members, means for steering said traction wheels, a trailing wheel in a swivel stirrup under the rear end of said other longitudinal members, a foot lever pivotally carried by said other longitudinal members, and a link connecting between said foot lever and said swivel-stirrup for steering independently of the front wheel steering.

5. In agricultural machinery having a pair of traction wheels, framing supported therebetween, and a power source on said framing for the traction wheels, a separable riding trailer, including an auxiliary frame having a pivotal connection to said framing for horizontal movement relative thereto, longitudinal members rigid with said connection and extending rearwardly, an earth-working tool carried by said members, other longitudinal members pivoted to said connection for relative vertical movement but rigid against lateral movement relative to the first-named members, a lever on said other longitudinal members for raising said tool-carrying members, a seat on said other longitudinal members, a trailing wheel under the rear end of said other longitudinal members, steering means for said traction wheels, and independent steering means for said trailing wheel.

6. In mechanism having a pair of traction wheels, framing supported therebetween, a power source on the framing, a post on said framing normal to the axis of the wheels, an auxiliary frame having a pivotal connection to said post for lateral movement relative to said framing, an earth-tool support connected to said framing rigidly in a vertical plane but allowing pivoting movement in a horiontal plane, said auxiliary frame including a seat-supporting frame generally parallel to said tool support and connected therewith in front preventing relative movement independent thereof in a horizontal plane but permitting relative movement in a vertical plane, and a trailing wheel under said seat-supporting frame.

7. In mechanism of the character described, a pair of tractor wheels, framing in association carrying a seat, a wheel with turnable mounting under the rear end of said framing, a foot lever for steering said wheel, a link between the foot lever and said wheel mounting, said link having a series of holes for adjustable connection to the said wheel mounting, an auxiliary frame under said framing carrying an earth-working tool, a hand lever on said framing for raising and lowering the auxiliary frame and tool, an arm secured to said foot lever, and a cam cage on said auxiliary frame surrounding the free end of said arm and having a convergent top, whereby said arm riding within said cam cage has freedom of lateral movement when the auxiliary frame carrying the tool is raised but is cammed into the convergent top when the auxiliary frame is lowered.

8. In mechanism of the character described, a pair of traction wheels, framing in association carrying a seat, a wheel with turnable mounting under the rear of said framing, a foot lever for steering said wheel, a link between the foot lever and said wheel mounting, an auxiliary frame under said framing carrying an earth-working tool, a hand lever on said framing for raising and lowering the auxiliary frame and tool, an arm secured to said foot lever, and a cam cage on said auxiliary frame surrounding the free end of said arm and having a convergent top for automatically orienting said arm and the steering of said wheel which is under the rear of said framing.

9. In mechanism of the character described, a pair of traction wheels, framing in association carrying a seat, a wheel with turnable mounting under the rear of said framing, a lever for steering said wheel, an auxiliary frame under said framing carrying an earth-working tool, a hand lever on said framing for raising and lowering the auxiliary frame and tool, and means operated in the lowering of the auxiliary frame for automatically setting said wheel with its turnable mounting into a predetermined path.

10. In mechanism of the character described, a framing and a pair of traction wheels, a seat-carrying frame connectible to said framing and having a steerable trail wheel, a tool-carrying frame under said seat-carrying frame, a cam on said tool-carrying frame, a foot-lever on said seat-carrying frame for steering said trail wheel, and an arm on said foot-lever movable in effective position for operation optionally out of relation with said cam for foot-steering of said trail wheel and in relation with said cam for automatic steering.

JOHN J. KANTZ, JR.
OSWALD J. LINDELL.

References Cited in the file of this patent

UNITED STATES PATENTS

| Number | Name | Date |
|---|---|---|
| 918,386 | Spensley | Apr. 13, 1909 |
| 1,037,257 | Hutchinson | Sept. 3, 1912 |
| 1,346,317 | Holstein | July 13, 1920 |
| 1,376,756 | Gallagher | May 3, 1921 |
| 1,385,535 | Frisby | July 26, 1921 |
| 1,435,161 | Holstein | Nov. 14, 1922 |
| 1,441,232 | Liedtke | Jan. 9, 1923 |
| 1,458,013 | Tampier | June 5, 1923 |
| 1,590,810 | Cording | June 29, 1926 |
| 2,016,774 | Geffray | Oct. 8, 1935 |
| 2,274,769 | Zink et al. | Mar. 3, 1942 |
| 2,358,539 | Smith | Sept. 19, 1944 |
| 2,457,821 | Johnson | Jan. 4, 1949 |

FOREIGN PATENTS

| Number | Country | Date |
|---|---|---|
| 893,187 | France | Jan. 24, 1944 |
| 424,647 | Germany | Jan. 27, 1946 |